United States Patent [19]
Blair et al.

[11] Patent Number: 5,623,565
[45] Date of Patent: Apr. 22, 1997

[54] OPTICAL SENSOR/ACTUATOR COMMUNICATION SYSTEM WITH COMMON CONTROL SITE INDEPENDENTLY RESPONDING TO INPUTS FROM SENSORS AND CONTROLLING ASSOCIATED ACTUATORS

[75] Inventors: Loudon T. Blair; Stephen A. Cassidy; Paul Urquhart; Colin A. Millar, all of Suffolk, United Kingdom

[73] Assignee: British Telecommunications public limited company, London, England

[21] Appl. No.: 347,299

[22] PCT Filed: May 28, 1993

[86] PCT No.: PCT/GB93/01130
   § 371 Date: Jan. 26, 1995
   § 102(e) Date: Jan. 26, 1995

[87] PCT Pub. No.: WO93/25020
   PCT Pub. Date: Dec. 9, 1994

[30] Foreign Application Priority Data

Jun. 1, 1992 [EP] European Pat. Off. ............ 92305011
Aug. 14, 1992 [EP] European Pat. Off. ............ 92307130

[51] Int. Cl.$^6$ .................................................. G02B 6/28
[52] U.S. Cl. ........................................ 385/24; 359/126
[58] Field of Search ............................... 359/126, 127; 250/227.14; 385/24, 27, 31, 39

[56] References Cited

U.S. PATENT DOCUMENTS

| | | | |
|---|---|---|---|
| 4,817,202 | 3/1989 | Meyer et al. | 455/603 |
| 4,942,294 | 7/1990 | Witte | 250/227.14 |
| 5,191,458 | 3/1993 | Lyons et al. | 359/127 |

FOREIGN PATENT DOCUMENTS

| | | |
|---|---|---|
| 0188889A2 | 7/1986 | European Pat. Off. . |
| 0206901A1 | 12/1986 | European Pat. Off. . |
| 0361368 | 4/1990 | European Pat. Off. . |
| 0489525A2 | 6/1992 | European Pat. Off. . |

OTHER PUBLICATIONS

IBM Technical Disclosure Bulletin, vol. 34, No. 11, 1 Apr. 1992, pp. 215–216 NOMEN NESCIO "Cost–Effective Fiber Laser Transmitter for WDMA".
Cheng et al, "Subscriber Loop Architecture", Technical Digest, No. 75, Sep. 1994, pp. 8–11.
Senior et al, "Devices for Wavelength Multiplexing and Demultiplexing", IEE Proceedings, vol. 136, Pt. J, No. 3, Jun. 1989, pp. 183–202.
Krohn, "Distributive Fiber Optic Sensing Systems", Advances In Instrumentation, vol. 42, No. 3, 1987, Research Triangle Park US, pp. 1219–1230.
Figueroa et al, "Fiber Optics for Military Aircraft Flight Systems", IEEE LCS, Feb. 1991, pp. 52–65.
Senior et al, "Wavelength Division Multiplexing in Optical Fibre Sensor Systems and Networks: A Review", Optics & Laser Technology, pp. 113–126.

*Primary Examiner*—Akm E. Ullah
*Attorney, Agent, or Firm*—Nixon & Vanderhye P.C.

[57] ABSTRACT

An optical communication system includes a head-end station, an optical fibre network and a number or sensors and actuators connected via the network to the head-end station. The head-end station includes one or more broadband sources and is arranged to output a broadband signal onto the network. The sensors modulate the broadband signal received from the head-end station and return narrowband components of the signal via the network to the head-end. There the different narrowband components are detected, for example using a demultiplexer and the resulting signals processed by control electronics. The head-end station also includes an optical circuit arranged to split a signal from a broadband source into different narrowband components. Electro-optic modulators (FOM) modulate the different narrowband components and the resulting narrowband signals are output onto the fibre network and transmitted to the actuators. The electro-optic modulators (FOM) are operated by the control electronics.

19 Claims, 9 Drawing Sheets

OPTICAL SENSOR/ACTUATOR COMMUNICATION SYSTEM WITH COMMON CONTROL SITE INDEPENDENTLY RESPONDING TO INPUTS FROM SENSORS AND CONTROLLING ASSOCIATED ACTUATORS

BACKGROUND OF THE INVENTION

1. Field of the Invention

The present invention relates to an optical communication system particularly suitable for use in gathering data from a number of sensors. Sensors of the type the present invention is concerned with are used, for example, in industry for process control, pollution monitoring and chemical/biological analyses. The system might also be used with domestic sensors, such as smoke detectors or burglar alarms.

The use of optical rather than non-optical wired networks for such sensors potentially offers a number of advantages, including immunity from sparking in a flammable environment, and immunity to electro-magnetic interference (EMI). However because of their characteristics of more or less continual data output at low data rates, sensors are not generally suitable for connecting directly to conventional optical telecommunications networks. It would be desirable to provide a network particularly suitable for sensor data but which also carries diverse other types of traffic.

2. Related Art

It has previously been proposed to provide a system using an optical fibre network having a bus-type topology to communicate data from a plurality of sensors to a head-end station. Each branch of the network is connected to the bus by a wavelength selective tap, so that each sensor communicates data on a different characteristic wavelength. Such a system is disclosed in "Wavelength Division Multiplexing in Optical Fibre Sensor Systems and Networks", J. M. Senior et al, OPTICS AND LASER TECHNOLOGY, Vol. 22, No. 1, 1st Apr. 1990. This network is primarily designed for one-way traffic from sensors to the head-end station. There are however situations where it would be desirable to provide two-way data communication on the network. In many systems for use in industrial processes, there will be associated with each sensor an actuator, such as a valve, switch or other control device, which is responsive to control signals received over the network so as to provide a control loop from the sensor via the head-end to the actuator. These control signals may be processed by a local computer at the actuator. In the context of the present specification, the term "actuator" also encompasses any other device responsive to optical signals received over the network, including the receive side of a telephone, where the two-way system is used to integrate, e.g. voice telephony with the carrying of sensor data.

EP-A-0206901 discloses a network in which a demultiplexer splits a broadband optical signal into different wavelength components and outputs each component on a different optical fibre going to a respective sensing or control device.

SUMMARY OF THE INVENTION

According to the present invention an optical communications system comprises:

a head-end station;

an optical fibre network; an a plurality of sensors and a plurality of actuators, each actuator being local to and associated with a respective one of the plurality of sensors, the sensors being arranged to communicate data via the network at a plurality of different wavelengths characteristic of different respective sensors and actuators;

the head-end station including:

an optical source;

means for outputting an optical signal from the source onto the network;

means for detecting narrowband components of the optical signal modulated by the sensors and returned via the network to the head-end station;

optical modulator means for selectively modulating different narrowband optical signals and means for outputting the resulting modulated signals onto the network for transmission to the actuators; and control means responsive to incoming data carried by the detected narrowband components and arranged to output outgoing data to the optical modulators.

Preferably, the optical source includes a broadband source and outputs a broadband signal onto the network, and the head-end station includes wavelength division means for splitting a signal from a broadband source into a plurality of narrowband components for modulation by the optical modulator means.

The optical modulators may take any convenient form such as magneto-optic or acousto-optic devices, but preferably are electro-optic modulators.

Preferably the network has a star topology and includes a first path for carrying optical signals between the head-end station and a first node, a plurality of branches extending from the node to respective sensors and a second path carrying optical signals from the head-end station to a second node, a plurality of branches extending from the second node to respective actuators, and means for selecting a wavelength component of the optical signal in a respective branch for reception at a corresponding actuator. Other topologies, such as bus-type topologies, may be used.

The present invention provides a system which makes it possible to integrate telephony or other two-way communications traffic such as data with a sensor network. The network can be configured so that control and management functions can be carried out solely at the head-end and the network as a whole is passive, i.e. it does not require active electronic or optical devices. The system is able to function using low cost broadband sources avoiding the need for high cost components such as DFB lasers. The network is suitable for use in such applications as process control, mechanical control systems in such fields as aeronautics, automation, robotics; environmental monitoring, telecoms local networks or computer networks; and mixed telecoms and sensor application such as remote metering integrated with communications. The network structure and function is independent of the type of actuator or sensor used, the sensors being coupled to the network indirectly via a modulator such as an Fibre Overlay Modulator (FOM).

Preferably branches of the optical fibre network extending to respective sensors include fibre overlay modulators arranged to modulate an optical signal in the branch in accordance with the output of the corresponding sensor. Preferably each branch further comprises a Bragg fibre grating arranged to select a particular narrowband component of the broadband optical signal received in the branch.

The head-end station may include two broadband sources, a first source providing the broadband output from the head-end station and a second source providing the input to the wavelength division means.

Alternatively, the head-end station may include a single broadband source and coupling means arranged to couple part of the broadband output of the source to the output of the head-end station, and part to the input of the wavelength division means.

Appropriate broadband sources are ELEDs or superfluorescent erbium fibre lasers, or other rare earth doped fibres. Although use of a single broadband source is much preferred, alternatively the optical source may be formed by multiplexing together a number of narrowband sources, in particular by using a collection of lasers each tuned to the wavelength of one sensor. As a further alternative, a variable frequency laser may interrogate different sensors in turn.

Preferably the wavelength division means has a star topology and includes a node which receives the signal from a broadband source and a plurality of branches extending from the node and means associated with the different branches for selecting different wavelength components of the signal.

Preferably the means for selecting different wavelength components comprise Bragg fibre gratings formed in the optical fibres of the different branches. Preferably the optical modulator means comprise fibre overlay modulators, or other fibre-based electrical-to-optical transducers, formed in the different branches of the wavelength division means.

BRIEF DESCRIPTION OF THE DRAWINGS

By way of example, embodiments of a system in accordance with the present invention will now be described in detail with reference to the accompanying drawings, in which.

DETAILED DESCRIPTION OF EXAMPLARY EMBODIMENTS

Figure 1:
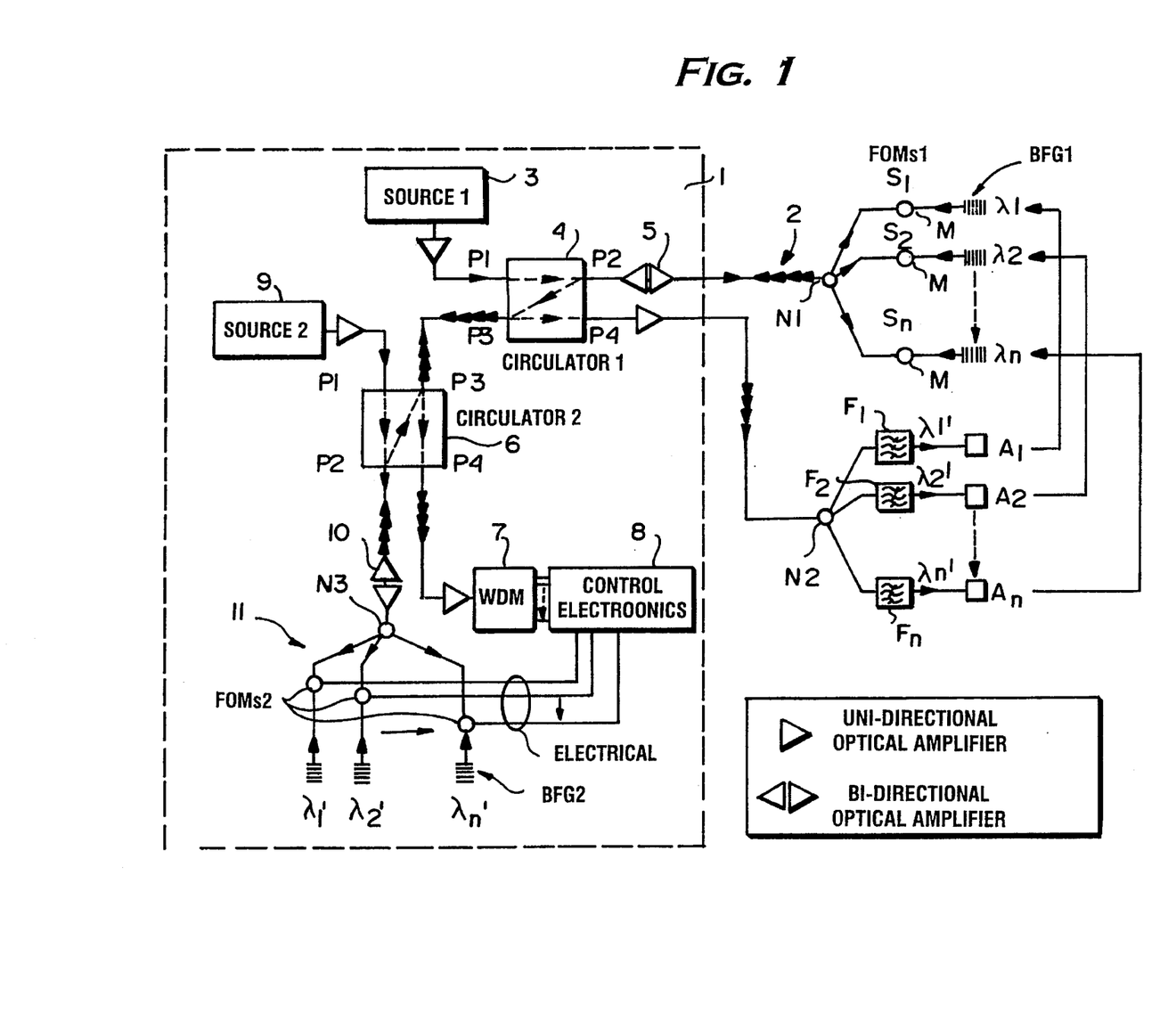
FIG. 1 is a block diagram showing schematically the configuration of the system.

An optical communication system comprises a head-end or "processing end" station 1 and a number of sensors $S_1 \ldots S_n$ connected to the head-end via an optical fibre network 2. There is associated with each sensor a corresponding actuator $A_1 \ldots A_n$ and these are also connected to the head-end via the network 2. Corresponding sensors and actuators need not necessarily be in the same physical location, although this will in general be the case. When the sensor is a security device, for example, the actuator might be an alarm located remotely in a police station. The network 2 has a star topology. Each of the sensors is connected to a respective branch extending from a first node N1. Similarly each of the actuators is connected to a branch of a second node N2.

The head-end includes a first broadband source 3 which transmits a broadband optical signal onto the network 2 via a first circulator 4 and a bi-directional optical amplifier 5. A suitable circulator is disclosed in Y. Fujii, "High Resolution Polarization-Independent Optical Circulator Coupled with Single-Mode Fibres", J. Lightwave Technology, Vol. 9, No. 4, pp. 456–460, Apr. 1991.

The system as a whole is capable of functioning without amplification, but the use of amplifiers makes it possible to increase the number of sensors or actuators which can be accessed. Amplifiers may be located throughout the system, but a particular advantage of the structure adopted for the system is that it is possible for all the necessary amplification to be carried out at the head-end, leaving the rest of the fibre network entirely passive. The amplifiers are discrete devices in the present example, but distributed fibre amplifiers may be used.

In use, the broadband optical signal from the head-end is received in the branch associated with each of the sensors. There an optical modulator M modulates the amplitude of the signal in the branch in accordance with the output of the respective sensor.

Figure 5:
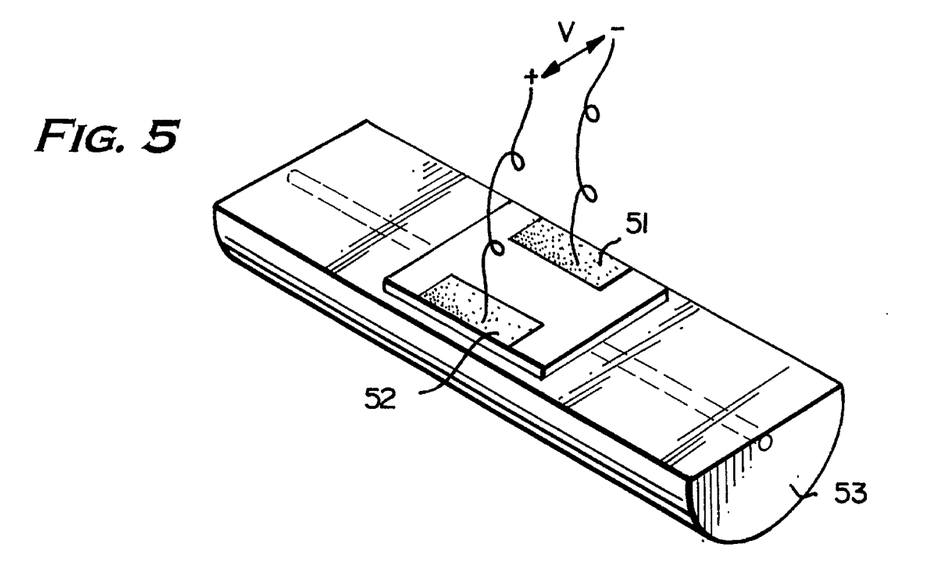
FIG. 5 is a perspective view of a fibre overlay modulator.

In the present example the modulator is a fibre overlay modulator. One example of such a fibre overlay modulator is shown in FIG. 5 and another example of such a modulator is described in British Patent No. 2170016. As used in the example of FIG. 5, the FOM acts an electro-optical interface. The electrical output of the sensors is output to electrodes 51, 52 of an overlay modulator and used to modulate the optical signal in a D-fibre 53 or a polished fibre coupler. The overlay is formed from a coating of electropolymer. By applying a voltage V across it optical amplitude modulation is induced through evanescent coupling. The D-fibre coupler can also be used to couple the optical output of an optical sensor (OSOO—optical sensor, optical output) onto the branch. For optical sensors which are compatible with single-mode fibre, such as interferometric devices, the FOM would be replaced with the sensor, with the spectral characteristics of the optical source being defined at the head-end. If the output of the sensor was an encoded version of the input, this would be fed back onto the communication highway. If detected electrically (OSEO—optical sensor, electrical output) and encoded as a voltage, the FOM could be used to modulate a proportion of the original signal and feed it back onto the network. Additionally, an interferometric sensor could act as a stand alone unit at a node and the electrical output of the sensor could modulate the FOM to feed back the optical sensor information to the head-end. In this way, the FOM acts as an interface element between an optical sensor and the sensor information gathering network.

Figure 6:
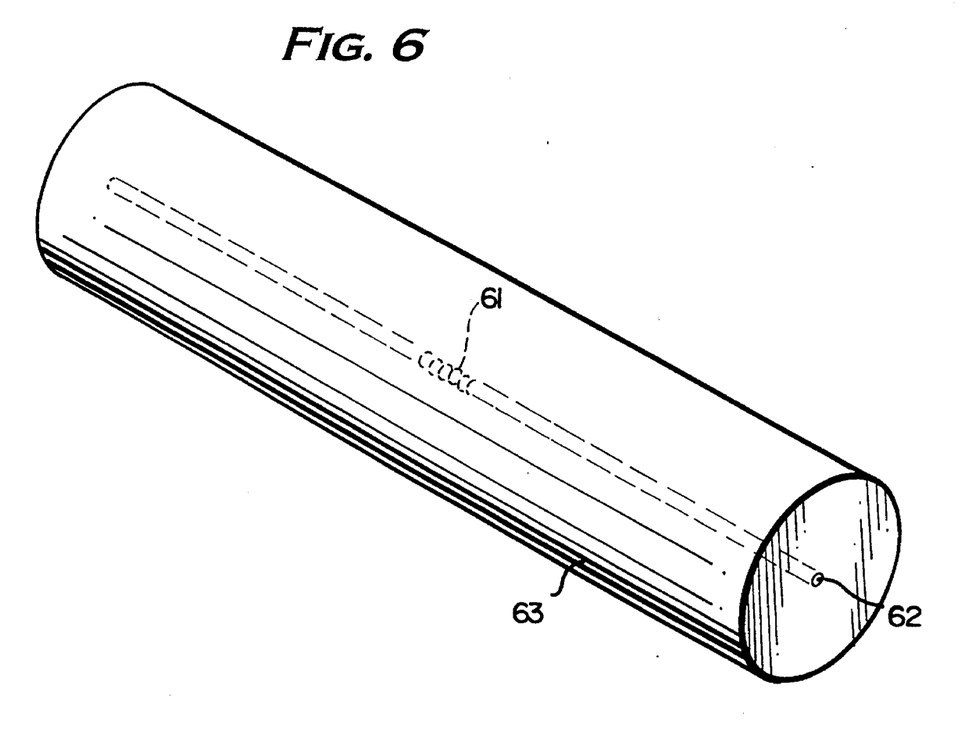
FIG. 6 is a perspective view of a fibre Bragg grating.

At each sensor, a wavelength component of the optical signal at a wavelength $\lambda 1 \ldots \lambda n$ is selected using a fibre-Bragg grating BFG1 and reflected back via the branch through the node to the head-end station 1. The fibre Bragg grating by selecting a particular wavelength carries out the combined functions of identifying the particular physical location of the node and encoding the data from the node onto the network in such a way that it can be differentiated from other sensors at the head-end. The grating is a simple, low-cost and effective fibre component. It can be encoded at the manufacturing stage to reflect a specific and very narrow spectral slice of the incident radiation having a width of approximately 1 nm. This is done by writing a periodic grating 61 into the core 62 of a germanium doped silica fibre 63. The remainder of the optical signal is transmitted to an absorbing medium termed by the inventors an optical dump. Thus, the signal returned to the head-end is encoded spectrally, identified spatially, and modulated by two passes through the FOM.

As an alternative to this reflection scheme, a bandpass filter may be used for the FOM. This may be a fibre filter or alternatively a planar device such as that disclosed in the paper "Laser-Trimmed Four-Port Bandpass Filter Fabricated in Single-Mode Photosensitive Ge-Doped Planar Waveguide", R. Kashyap et al, IEEE Photonics Technology Letters, Vol. 5, No. 2, 1993. Where a transmissive filter is used, the network structure is modified by providing a separate return feeder network, to the head-end, onto which the encoded signal from the sensor is redirected.

Figure 8:
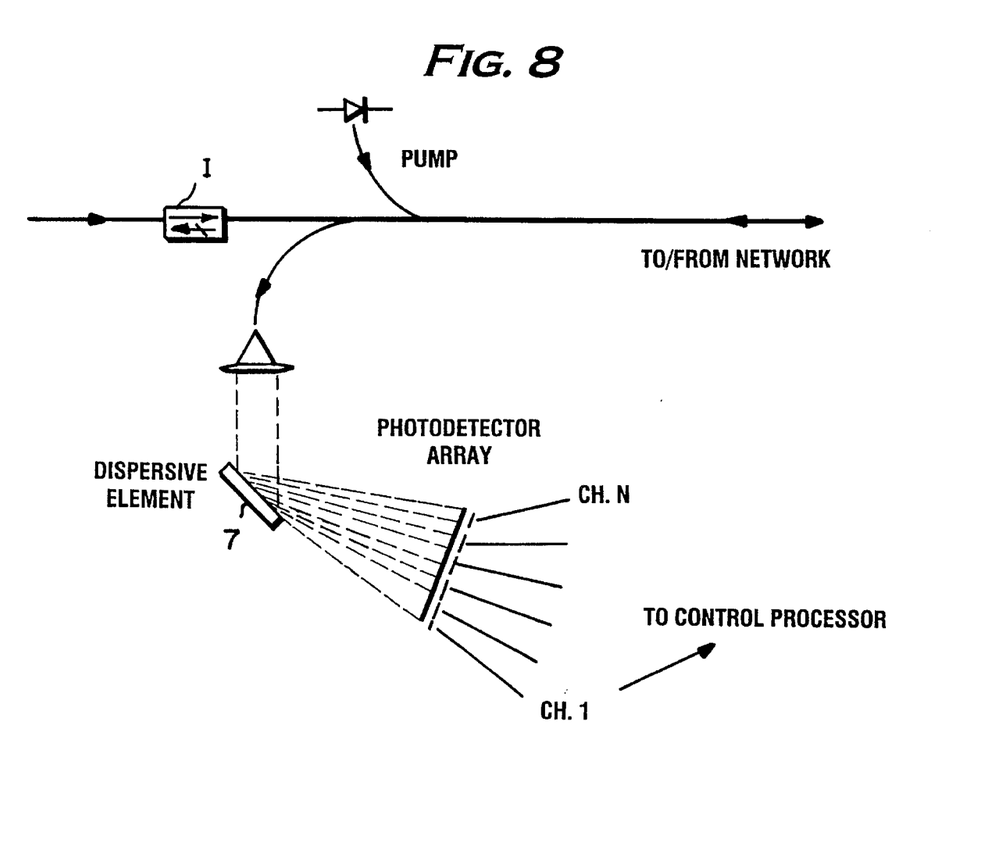
FIG. 8 shows a de-multiplexer for use in the head-end.

At the head-end station the different wavelength components from the different sensors pass back through the first circulator 4 through a second circulator 6 to a wavelength de-multiplexer 7. The wavelength de-multiplexer is shown in further detail in FIG. 8. The wavelength de-multiplexer may be, for example, based on a planar WDM, a holographic grating, or a number of Bragg fibre gratings combined with 50:50 fused fibre couplers. The dispersive element 7 has associated with it detectors for converting the different signals to electrical signals for processing in a control processor 8. The detectors may be in the form of a linear photodetector array PDA having output channels CH1-CHN.

The number of channels is limited by the ratio of source bandwidth to grating selectivity. For example, a 25 nm BW source, 0.5 nm selective grating and 1 nm spacing gives 25 channels. Where more sensors are required, then several sensors may be electrically multiplexed onto each modulator on a given branch. Alternatively a further set of sensors sharing the same set of frequencies may be provided with the different blocks of sensors being clocked alternately at a relative slow, e.g. 0.1 Hz, clock rate, as further described below.

Figure 2:
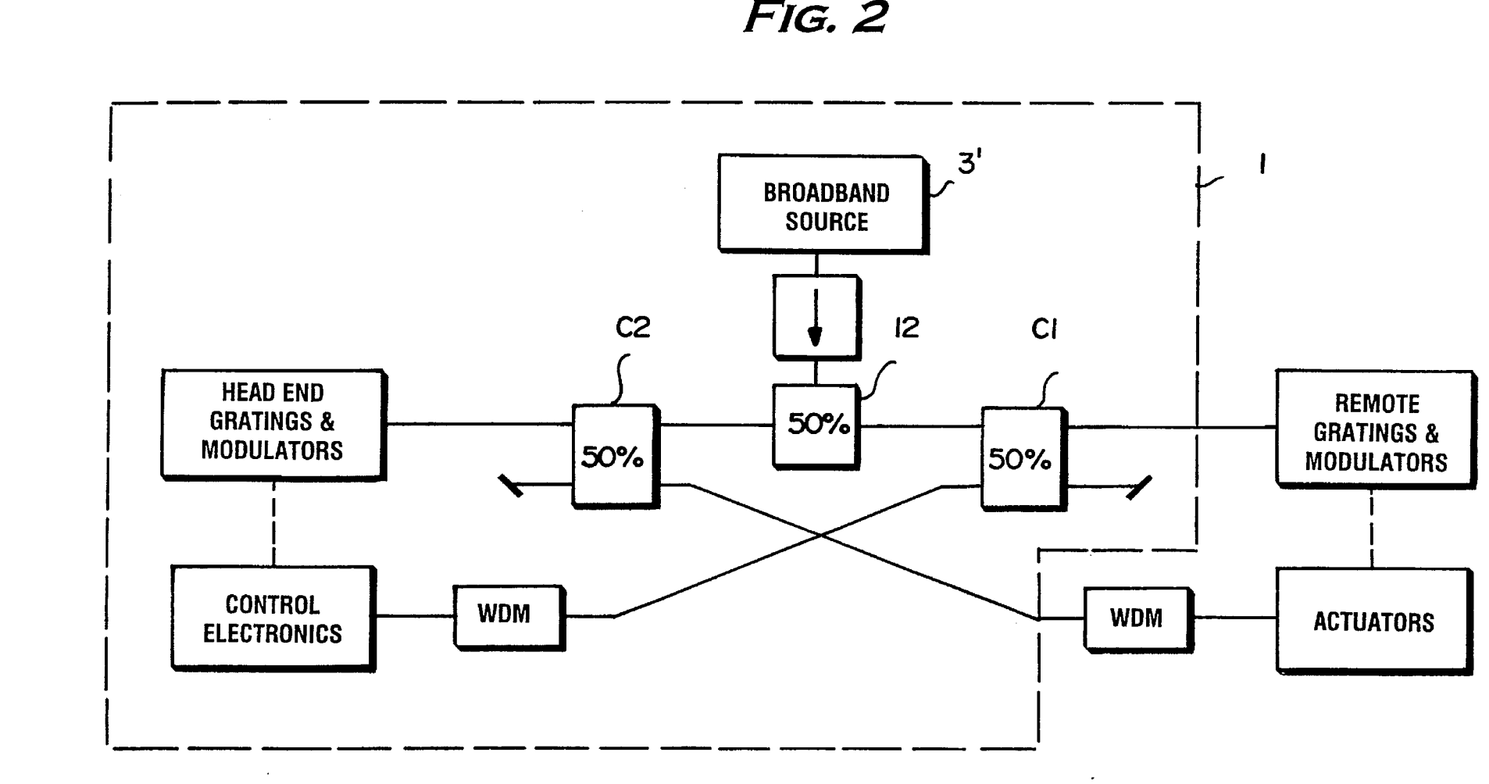
FIG. 2 shows an alternative head-end station for use with the system of FIG. 1.

The first and second circulators already referred to, are four-port uni-directional low-loss isolating taps which guide light through ports 1 to 2 to 3 to 4 respectively. Circulators have the advantage of very low coupling losses but are relatively expensive components. As an alternative, a system functionally equivalent to the two back-to-back circulators of the present example may be constructed using conventional 50% fused fiber couplers, as shown in the example of FIG. 2. In this example, a single broadband source is used.

In the system of FIG. 1, the head-end includes a second broadband source 9. The second circulator 2 couples light from the second broadband source 9 from port 1 through port 2 to a 1×N splitter node N3. A further bi-directional optical amplifier 10 may be included between the second circulator 6 and the node N3. One branch is provided from the node N3 for each of the n channels. An electro-optical modulator (FOMs2) is provided in each branch. This modulates the amplitude of light in the respective branch in response to control signals from the control electronics 8. A filter BFG2 which, as at the sensors, may be a fiber-Bragg grating, selects the appropriate wavelength component in each branch and returns it via the node N3 to the second circulator 6. It then passes from port 2 of the circulator to port 3 and from there to port 3 of the first circulator 4. It is then output onto the network from port 4 of the first circulator. As already described, the appropriate channels are selected by the different actuators AG . . . An using band pass filters F1 . . . Fn which may also be formed from Bragg fiber gratings tuned to wavelengths corresponding to the different narrowband components output by the head-end station.

In use, control signals are generated in the head-end by the control electronics 8 and modulated onto the different channels passing through the node N3 and subsequently output across the network to the actuators.

The actuators may be control devices associated with sensors in an industrial plant. For example, each sensor might be a pressure-sensitive device, monitoring the pressure at a particular point in a pipeline. The actuators in this case might be relief valves which are actuated to control the pressure at the given location under the control of the control electronics 8 in the head-end station. Local processors may be provided at the actuator sites to give intelligent communication.

Telephony may be integrated with the sensor network, in which case the sensor corresponds to the transmit side of a subscriber station and the actuator corresponds to the receive side. Then, for example, if somebody at location 1 wants to talk to somebody at location 3, a signal at S1 is passed on $\lambda 1$ to the WDM and is processed by the control electronics 8. An output from the control electronics then modulates light in the branch of the third node N3 corresponding to wavelength $\lambda 3'$. The signal modulated on this wavelength passes to actuator A3 at location 3 which in turn switches the corresponding sensor S3. S3 opens to allow $\lambda 3$ to pass to the WDM/controller telling it to open $\lambda 1'$. Thus $\lambda 1'$ passes to actuator A1 which in turn informs sensor S1 that a connection has been made. A telephone link and two-way communication are thereby established.

FIG. 2 shows an alternative configuration for the head-end using a single broadband source 3'. The output from the source is split by a 50% coupler 12. Part of the output from the coupler 12 then passes via a further 50% coupler C1 and is output onto the network. Selective wavelength components are then modulated and returned by the sensors in the same manner as described above. The returned wavelength components again pass through the 50% coupler C1 to the wavelength divider WDM and control electronics.

The other part of the broadband output from the source 3' passes through another 50% coupler C2 to the head-end gratings and modulators. This divides it into narrowband components which are then output onto the network and received at the actuators, in the same manner as for the system described above.

The configuration adopted in the system of FIG. 2 involves higher coupling losses than the system using circulators as shown in FIG. 1. The component cost however is lower.

Figure 3:
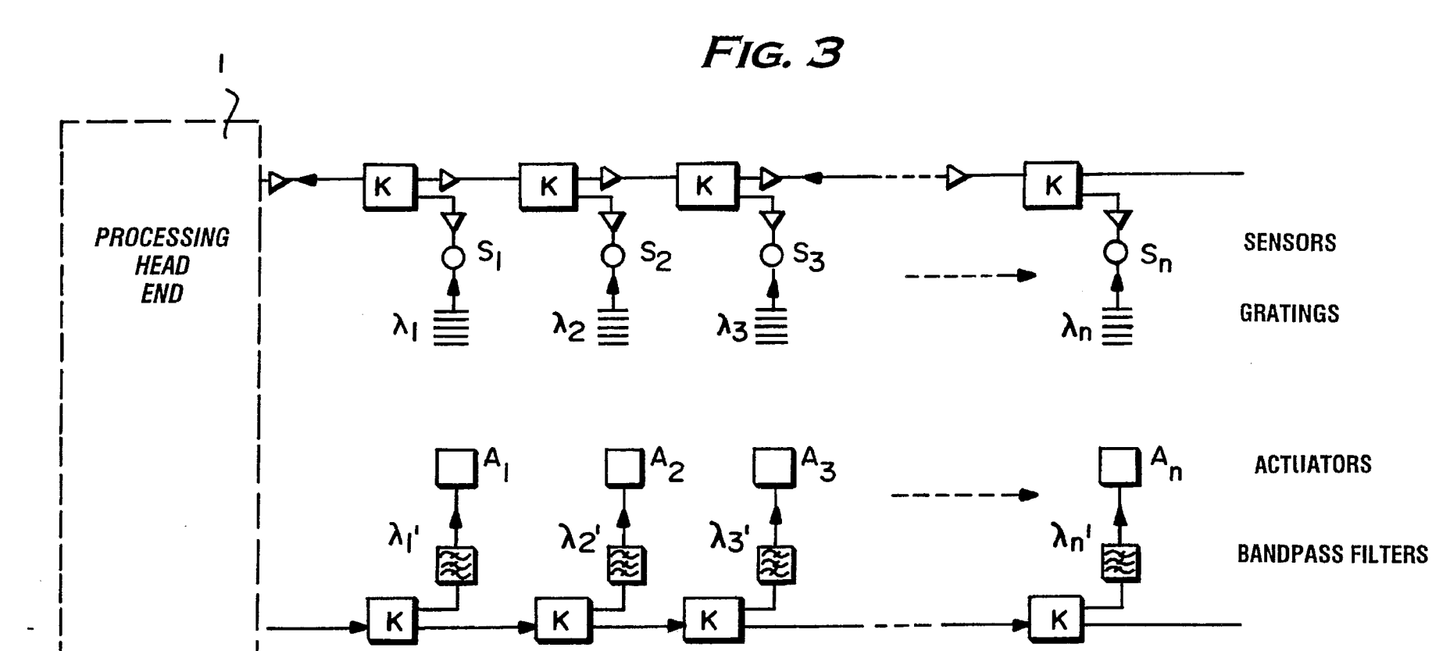
FIG. 3 shows a system using an alternative topology for the network.

FIG. 3 shows an alternative topology for the sensor/actuator network. In this network the processing end is configured identically to that shown in FIG. 1, but the network linking the processing element to the sensors and actuators is configured as a pair of buses, one bus carrying data from the sensors and the other bus carrying data to the actuators. Each branch of the network is linked to the respective spine by a fused fiber coupler K.

As noted above, one advantage of the configuration adopted in the present invention is that amplification can be confined to the processing end and the rest of the network can be passive in construction. However, for applications where it is desired to further increase the number of sensors/actuators connected to the network, additional amplification may be provided integrated with the network. Advantageously, this is done by forming the spine of the network from a fiber amplifier. It can be shown that with realistic optical pump power levels of 20 mW, use of more than 50 sensors/actuators is then possible by a single network. As the loss in the fiber is relatively inconsequential, networks having a total span varying from a few meters to a few kilometers are possible. For some applications even smaller networks may be used. The gain of fiber amplifiers scales with the level of doping and the length of the fiber. Accordingly a desired gain can be achieved either using a short fiber with heavy doping, or a longer fiber with relatively light doping.

There is described below in detail the performance of one such network. This approach achieves a nearly-balanced optical power output for identical taps at one signal wavelength. The effectiveness of this scheme within the bandwidth of the amplification medium depends on the spectral flatness of the gain spectrum and the taps.

Signal levels on the bus are low to avoid saturation of the amplifying fiber. This is important for signals which are slowly varying to avoid crosstalk. Alternatively, the bit rate may be increased to overcome the problems of operation in the saturation regime. For heavily-multiplexed sensor systems, the optical power transmitted per channel should be around $P_{SAT}/2N$, consistent with the low source brightness. $P_{SAT}$ the saturation power is given by $$P_{SAT} = \frac{h\nu_s \pi a^2}{\sigma_e \tau_f}$$

where h: Planck's constant v: signal frequency a: core radius $\sigma_e$: signal stimulated emission cross section $\tau_f$: fluorescence lifetime for signal emission.

Typically, $P_{SAT}$ is in the range 0.1 mW to 10 mW, generally around 1 mW.

This assumes a top hat mode, i.e. the signal is unity within the core radius and zero elsewhere.

Experiments have shown that noise from the amplifier is not a limiting factor for such a network ("Demonstration of a Distributed Optical Fiber Amplifier BUS Network", T. J. Whitley et al., published at pp 236–239 Optical Amplifiers and their Applications, 1990 Technical Digest, Vol 13, Aug. 6–8 1990, Monterey, Calif.).

A detailed computer simulation has been carried out of the performance of a distributed fiber amplifier in the spine going to the sensors. In the example considered, the spine is erbium-doped and has 50 taps. The system is co-directionally pumped at 1480 nm and amplifies a small signal at 1536 nm. The ports consist of undoped fiber connected to the doped spine by identical dichroic directional couplers spaced at equal intervals. In this example, the ports on the spine are at 10 meter intervals and it is assumed that the sensors are at the end of several more meters of undoped fiber. As earlier discussed, in such sensing applications the data rate is very low compared to telecommunications traffic being less than 1 Mbit/s and typically 10s or 100s of kbit/s or lower. It is thus possible to employ relatively slow speed but very high sensitivity detectors so that a signal power in excess of 1 µW at the detectors suffices for the overwhelming majority of applications.

Figure 11:
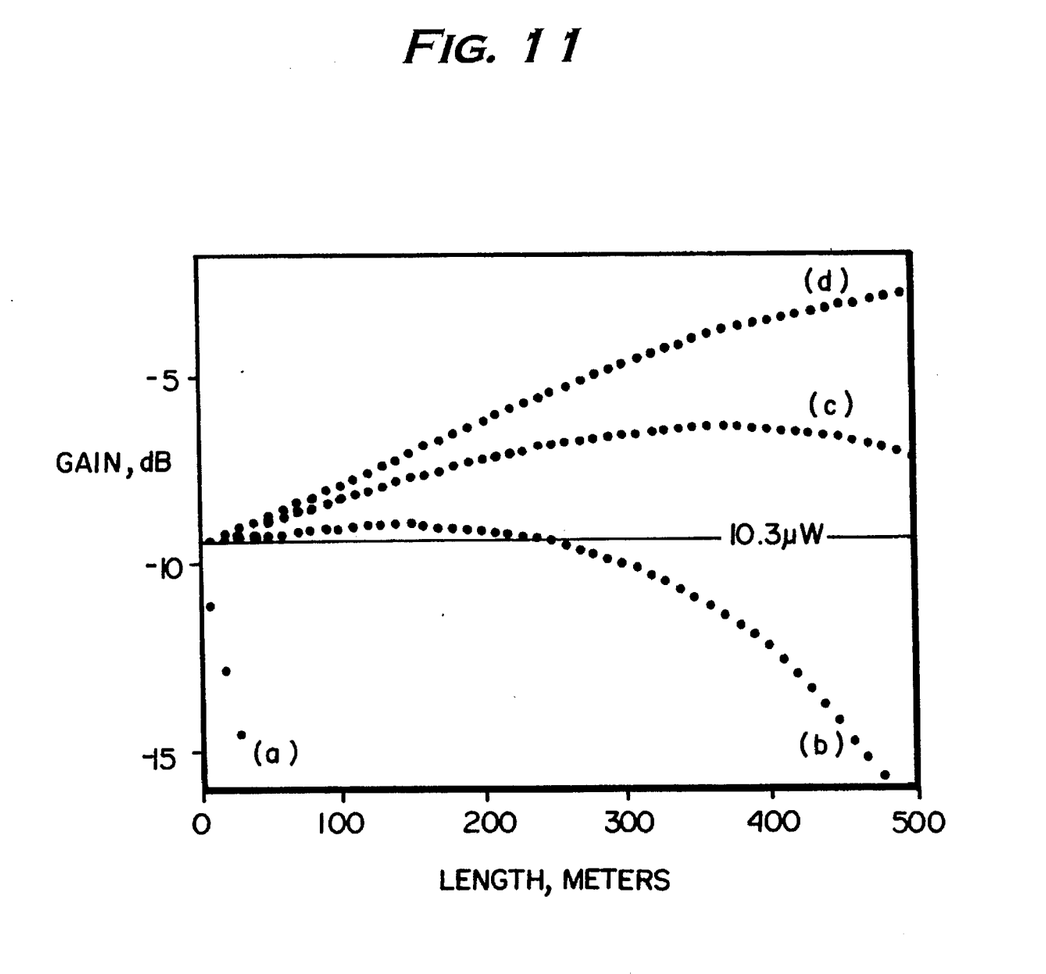
FIG. 11 is a plot of amplified output power from an erbium-doped bus as a function of the launched signal power.

The theory required to perform the calculation applies to a three-level amplifying medium with direct pumping into the upper ionic manifold. The appropriate propogation equations were solved subject to a set of initial conditions that were periodically redefined to account for the directional couplers. A large number of constant values are required in order to solve for such a system and they are listed in Table 1. FIG. 11 shows the variation of gain with respect to fiber length for various values of launched pump power. The graph consists of four sets of discrete points and these represent the signal output power from the various ports expressed as a gain with respect to the launched signal power. The value of 10.3 µW marked on the horizontal line is the absolute power from port 1. Curve (a) shows the gain associated with the first three ports when the system is unpumped, and, as would be expected for a three-level amplifying medium, there is very significant absorption. When pumped at 18.8 mW, curve (b) shows that the output power from the first 25 ports is no less than the output power from the first. Curves (c) and (d) show that at higher values of launched powers of 37.6 mW and 75.2 mW respectively it is possible to ensure that the bus operates so that all 50 ports provide signal power that is greater than or equal to 10.3 µW.

This simulation shows that using a distributed fibre amplifier as the spine of a bus, it is possible to provide a system with as many as 50 sensors while still maintaining acceptable values of signal power to each sensor. An output power in excess of 10 µW is sufficient to ensure suitable performance even if there is a further 10 dB attenuation prior to each detector.

Figure 7:
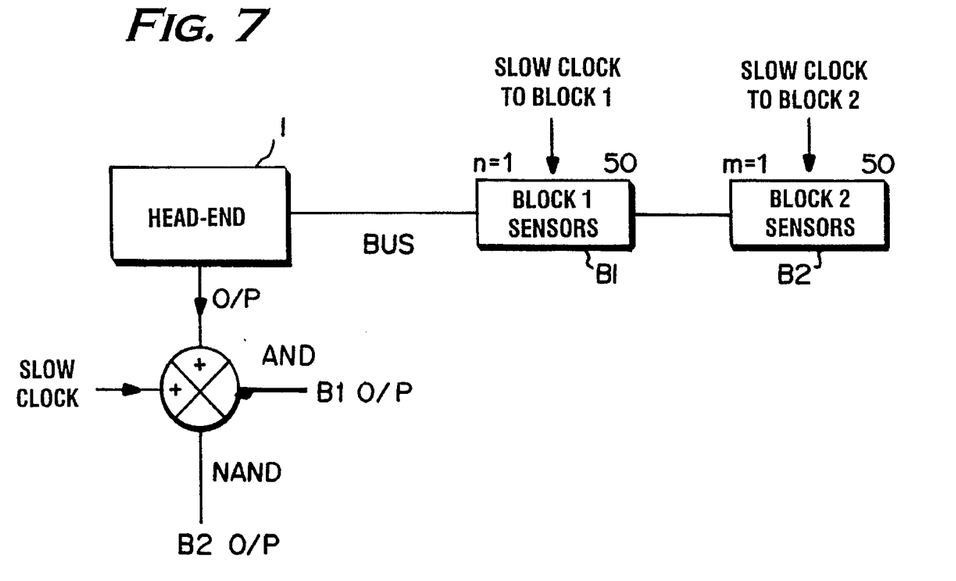
FIG. 7 is a block diagram showing a slow-clocking scheme.

If a further increase in the number of sensors/actuators is required, then this may be achieved by arranging the head-end to interrogate, for example, one block of 50 sensors B1 in one time frame, and another block of 50 sensors B2 in a second time frame, with wavelength allocations being shared between the two groups of sensors. This arrangement requires some form of slow, e.g. 0.1 Hz, clocking from the head-end to be distributed to the FOM or other modulator in the sensors to prevent signals from returning while another block is being interrogated. The clocking scheme is shown in FIG. 7. With this arrangement, very simple TDM can be used, on a much slower time frame than traditional TDM and without prejudicing cost effectiveness of the network function. The network still functions on a quasi-continuous basis.

Figure 4:
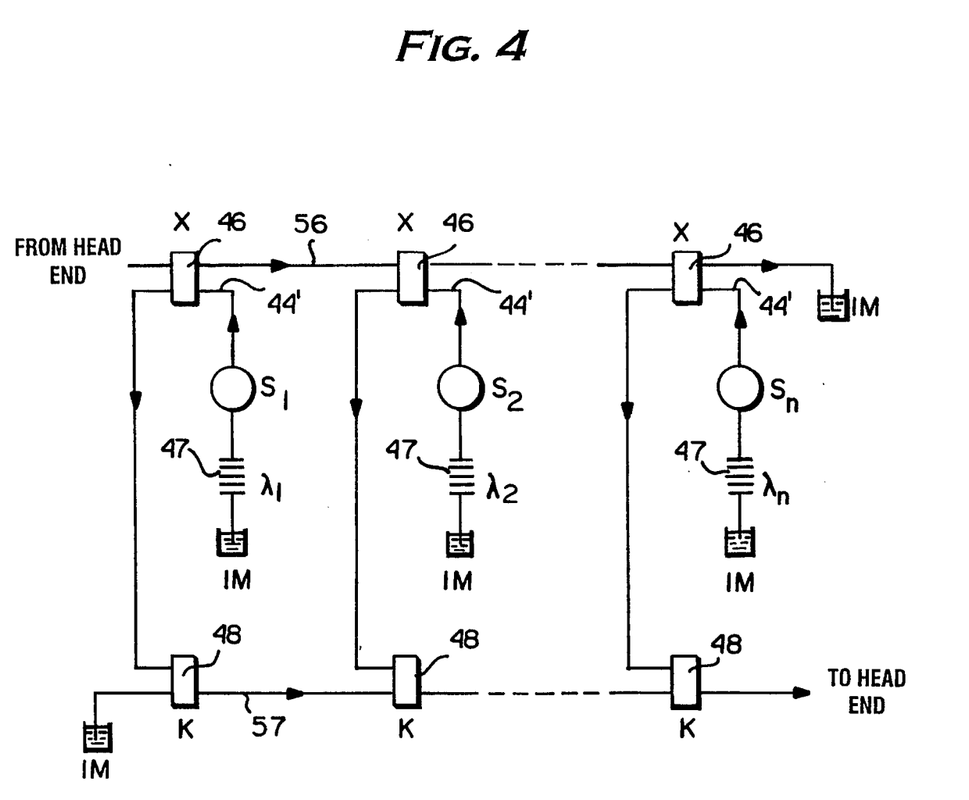
FIG. 4 shows a further modification to the system of FIG. 3.

As a further modification to the configuration shown in FIG. 3, the duplex bus extending to the sensors may be replaced by a ladder-network as shown in FIG. 4. In this case, two spines are used for the sensors, an input spine 56 and output spine 57.

For each branch 44, power is tapped from the input spine in the forward direction by a 4-port low percentage coupler 46. It is then directed through the sensor $S_1 \ldots S_n$ and diffracted by the Bragg fibre grating 47. The reflected signal returns to the 4-port coupler where the majority of power exits through the second input port. The remainder of the signal transmitted through the grating 47 is absorbed or scattered in an index matching medium IM. The signal exiting from the second input part is guided onto the output spine 57 by a second low-percentage coupler 48. The signals are de-multiplexed and processed at the head-end, as before.

In a trial system, both reflective and transmissive geometries where tested in conjunction with sensors formed of high bend loss fibre in which an attenuation of 15 dB is induced by bending. Thus in an unbent state a signal was passed through the sensors, but if the fibre was compressed then the signal was depleted. For the purposes of the trial, the output signals were monitored using an optical spectrum analyser.

Figure 9A:
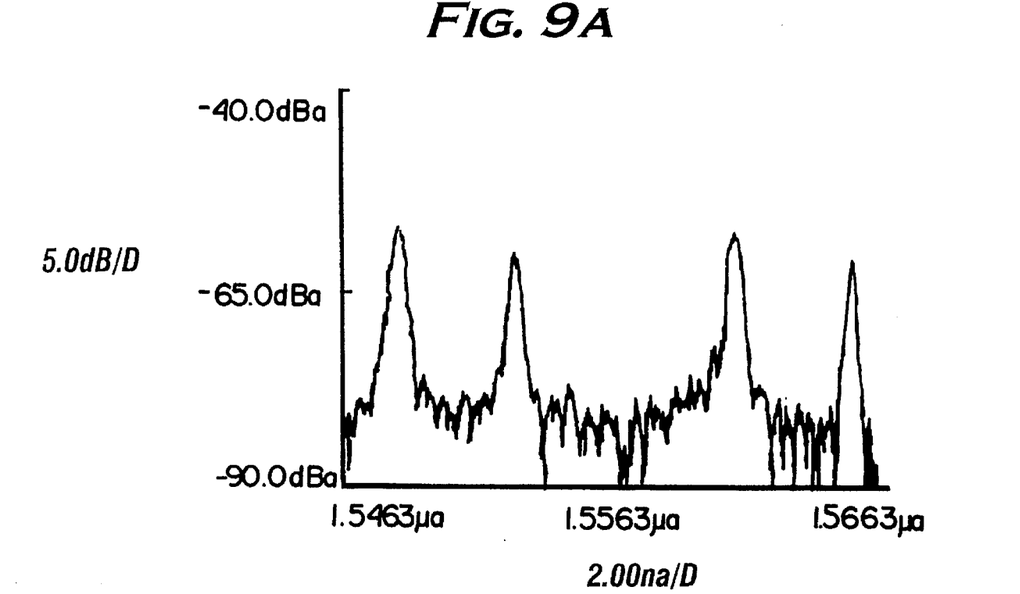
FIGS. 9A and 9B are output signals from four sensors using reflection geometry.
Figure 9B:
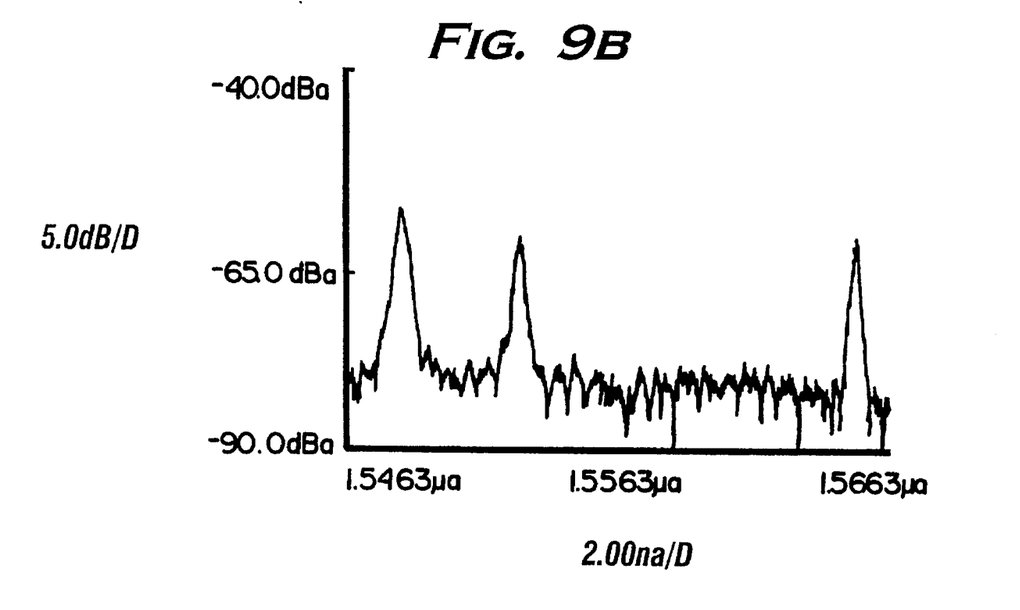
Figure 10A:
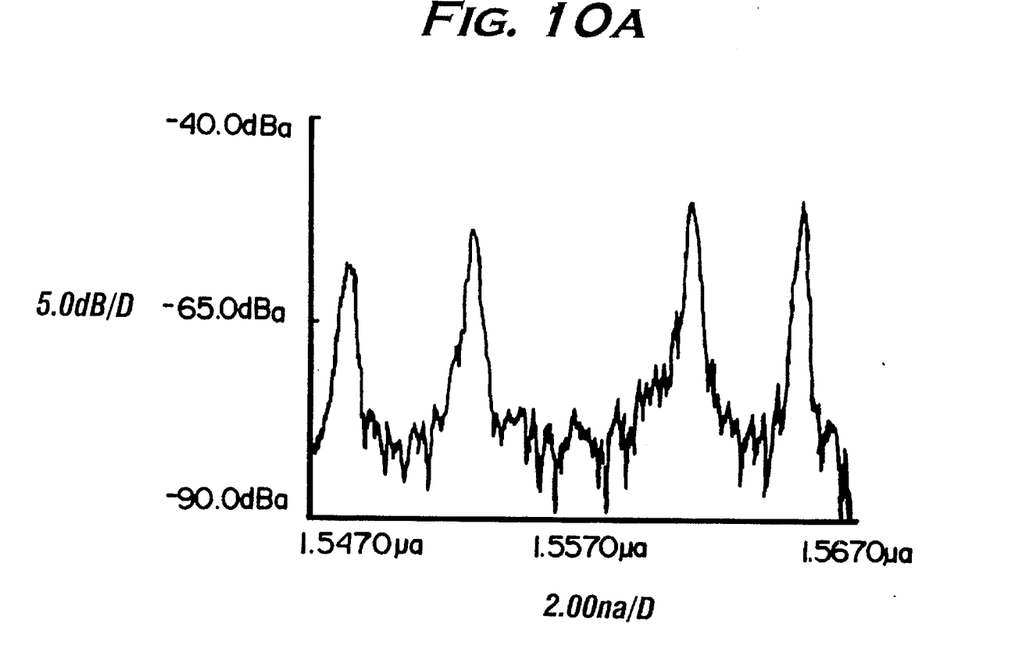
FIGS. 10A and 10B are output signals from four sensors using transmission geometry.
Figure 10B:
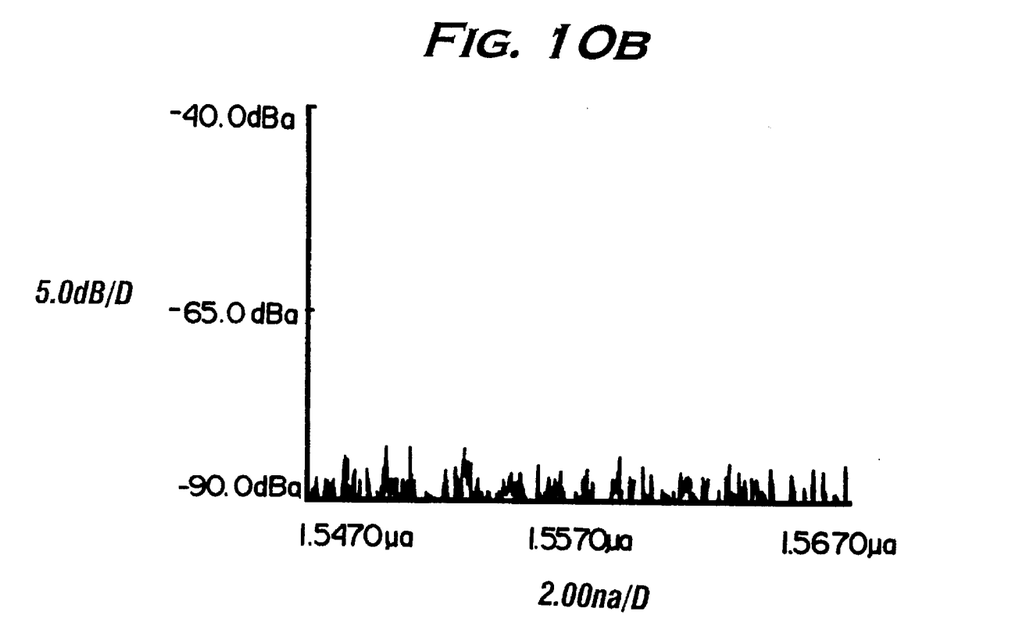

The source in the head-end was an Erbium doped fibre pumped by a laser diode operating at 1.46 μm with 30 mW pump power. This provides a broadband source of bandwidth 25 nm and an input power of +9 dBm operating at 1.55 μm. An optical isolator was positioned at the output of the Erbium doped fibre to suppress back reflections and 10% couplers were used. The bend loss fibre sensors were multiplexed using four Bragg gratings. FIGS. 9A and 9B show the results obtained with a reflective geometry. FIG. 9A shows the output when one of the sensors, sensor 3 at 1561 nm is depressed. FIGS. 10A and 10B show the results obtained using a transmissive ladder-network geometry. FIG. 10A shows the output from all four sensors, and FIG. 10B shows the output when all four sensors are depressed.

TABLE 1

| QUANTITY | SYMBOL | VALUE |
| --- | --- | --- |
| signal input power | $P_{si}$ | 89.4 μW |
| pump wavelength | $\lambda_p$ | 1480 nm |
| signal wavelength | $\lambda_s$ | 1536 nm |
| cut off wavelength | $\lambda_c$ | 1450 nm |
| total doped fibre length | $L_{max}$ | 500 meters |
| number of couplers | N | 50 |
| core radius | a | 2.5 μm |
| signal coupling ratio | $K_s$ | 10% |
| pump coupling ratio | $K_p$ | 1% |
| signal coupler loss | $\tau_s$ | 1% |
| pump coupler loss | $\tau_p$ | 1% |
| doping density | $\eta_t$ | $10^{23}$ ions/m$^3$ |
| signal background loss | $\alpha_s$ | 0.3 dB/km |
| pump background loss | $\alpha_p$ | 0.5 dB/km |
| pump absorption cross-section | $\sigma_{13}$ | $1.87 \times 10^{-25}$ m$^2$ |
| pump emission cross-section | $\sigma_{31}$ | $0.75 \times 10^{-25}$ m$^2$ |
| signal absorption cross-section | $\sigma_{12}$ | $3.90 \times 10^{-25}$ m$^2$ |
| signal emission cross-section | $\sigma_{21}$ | $4.50 \times 10^{-25}$ m$^2$ |

We claim:

1. An optical communications system comprising:

a head-end station;

an optical fibre network; and a plurality of sensors and a plurality of actuators, each actuator being local to and associated with a respective one of the plurality of sensors, the sensors and actuators being arranged to communicate data via the network at a plurality of different wavelengths characteristic of different respective sensors and actuators;

the head-end station including:

an optical source;

means for outputting an optical signal from the source onto the network;

means for detecting narrowband components of the optical signal modulated by the sensors and returned via the network to the head-end station;

optical modulator means for selectively modulating different narrowband optical signals and means for outputting the resulting modulated signals onto the network for transmission to the actuators; and control means responsive to incoming data carried by the detected narrowband components and arranged to output outgoing data to the optical modulator means.

2. An optical communications system as in claim 1, in which the optical source is a broadband source and outputs a broadband signal onto the network, and in which the head-end station includes wavelength division means for splitting a signal from a broadband source into a plurality of narrowband components for modulation by the optical modulator means.

3. A system as in claim 2, in which the wavelength division means have a star topology and include a node which receives a signal from a broadband source, a plurality of branches extending from the node, and means associated with the different branches for selecting different wavelength components of the signal.

4. A system as in claim 3, in which the means for selecting different wavelength components comprise Bragg fibre gratings formed in the optical fibres of the different branches of the wavelength division means.

5. A system as in claim 3 in which the optical modulator means comprise fibre overlay modulators formed in the different branches of the wavelength division means.

6. A system as in claim 1 in which the head-end station includes two broadband sources, a first source providing the broadband output from the head-end station and a second source providing the input to wavelength division means.

7. A system as in claim 1 in which the head-end station includes a single broadband source and coupling means arranged to couple part of the broadband output of the source to the output of the head-end station, and part to the input of the wavelength division means.

8. A system as in claim 1 in which the head-end station includes two 4-port circulators connected back-to-back so as to provide bi-directional transmission paths to the wavelength division means and to the broadband output of the head-end station.

9. A system as in claim 1 in which the head-end station includes one or more optical amplifiers.

10. A system as in claim 1 in which the network has a star topology and includes;

a first path for carrying optical signals between the head-end station and a first node, a plurality of branches extending from the node to respective sensors, and a second path carrying optical signals from the head-end station to a second node, a plurality of branches extending from the second node to respective actuators and means for selecting a wavelength component of the optical signal in a respective branch for reception at a corresponding actuator.

11. A system as in claim 1 in which the network has a bus topology and includes;

a first spine for carrying optical signals between the head-end station and the sensors, a plurality of branches extending from the first spine to respective sensors, a second spine for carrying optical signals from the head-end station to the actuators, a plurality of branches extending from the second spine to respective actuators, and means for selecting a wavelength component of the optical signal in a respective branch for reception at a corresponding actuator.

12. A system as in claim 10 in which branches of the optical fibre network extending to respective sensors include fibre overlay modulators arranged to modulate an optical signal in the branch in accordance with the output of the corresponding sensor.

13. An optical communications system as in claim 10 in which each branch of the network includes a transmissive filter arranged to select a particular component of the optical signal received in the branch.

14. A system as in claim 10 in which each branch further comprises a Bragg fibre grating arranged to select a particular narrowband component of the optical signal received in the branch.

15. A head-end station for use in an optical communications system, the head-end station comprising:

an optical source;

means for outputting an optical signal from the source onto an optical fibre network;

means for detecting narrowband components of the optical signal modulated by sensors and returned via the network;

optical modulator means for selectively modulating different narrowband optical signals and means for outputting the resulting modulated signals onto the network for transmission to activators; and control means responsive to incoming data carried by the detected narrowband components and arranged to output outgoing data to the optical modulator means.

16. A head-end station according to claim 15, in which the optical source is a broadband source arranged to output a broadband signal onto the network, the head-end station further comprising wavelength division means for splitting a signal from a broadband source into a plurality of narrow band components for modulation by the optical modulator means.

17. An optical communications system comprising:

a head-end station;

an optical fibre network; and a plurality of sensors arranged to communicate data via the network;

the head-end station including means for outputting an optical signal onto the network and means for detecting narrowband optical signals returned from the sensors;

branches of the network extending to respective sensors including fibre overlay modulators arranged to modulate an optical signal in the branch in accordance with the output of the corresponding sensor.

18. A system as in claim 17, in which each branch includes means for selecting a different respective narrowband component of an optical signal received from the head-end station, and the sensor is arranged to return data to the head-end station modulated on the said narrowband component.

19. A system as in claim 18, in which the means for selecting a different respective narrowband component comprise Bragg fibre gratings formed in the optical fibres of the respective branches.

* * * * *